United States Patent [19]
Crawford et al.

[11] 4,136,510
[45] Jan. 30, 1978

[54] FEEDER FINGER ASSEMBLY FOR HAY BALERS

[75] Inventors: LeRoy A. Crawford, New Holland, Pa.; Paul S. Trible, Delaplane, Va.

[73] Assignee: Sperry Rand Corporation, New Holland, Pa.

[21] Appl. No.: 825,999

[22] Filed: Aug. 19, 1977

[51] Int. Cl.² ............................................. A01D 39/00
[52] U.S. Cl. ..................................... 56/341; 100/142; 100/189; 198/740; 198/741
[58] Field of Search ................................. 56/341–343; 100/142, 141, 189, 188 R; 198/736–749

[56] References Cited
U.S. PATENT DOCUMENTS

| | | | |
|---|---|---|---|
| 2,862,347 | 12/1958 | Nelson | 56/341 |
| 3,030,877 | 4/1962 | McDuffie et al. | 100/142 |
| 3,602,365 | 8/1971 | Fisher et al. | 198/740 |
| 3,620,359 | 11/1971 | Smith | 198/743 |
| 3,724,363 | 4/1973 | Nolt | 100/189 |
| 3,736,866 | 6/1973 | Herrick | 100/189 |
| 3,812,777 | 5/1974 | Yound et al. | 100/189 |
| 3,880,073 | 4/1975 | Eberly et al. | 100/142 |

*Primary Examiner*—Russell R. Kinsey
*Attorney, Agent, or Firm*—John B. Mitchell; Frank A. Seemar; Ralph D'Alessandro

[57] ABSTRACT

An improved adjustable feeder finger assembly for a hay baler is disclosed. The improved assembly is comprised generally of three elements, i.e., a bracket for affixment to a driven element of the infeed mechanism, a feeder finger, and means to hold the two together. Frictional mating surfaces on the bracket and finger insure that the selected relative relationship between the two elements is maintained during operation.

18 Claims, 5 Drawing Figures

FEEDER FINGER ASSEMBLY FOR HAY BALERS

BACKGROUND OF THE INVENTION

This invention relates generally to hay balers, and specifically to an improved feeder finger assembly for use with the infeed mechanism of a hay baler.

The quest for increased efficiency in agricultural mechanization has resulted in improved equipment in all phases of harvesting and gathering of crops. Of interest to the instant invention is the hay baler which has progressed during the last four decades from a crude semi-automatic apparatus to a highly reliable and completely automated crop baling machine.

Though the various manufactured baler designs include elements which broadly perform similar process steps, there are structural variations which set one machine apart from another. Generally, modern automatic balers pick up crop materials from a windrow or swath lying on the ground, deposit them in an infeed housing where they are moved by a feeding mechanism into the bale forming chamber. In the bale forming chamber the crop materials are compacted by a reciprocating plunger and pushed through a tying mechanism before being ejected through the rear of the baler onto the ground or into a trailing wagon. The instant invention is directed to an improvement in the feeding mechanism within the infeed housing.

Some balers, such as shown in U.S. Pat. No. 2,450,082, employ a rotating auger to move the crop materials from the pickup to the bale forming chamber. On the other hand, there are a number of balers on the market which substantially accomplish the same result by the use of a multiplicity of pivoted feeder fingers moved through a complex pattern by mechanical linkages (see for example, U.S. Pat. No. 2,885,953). Though the instant invention could be advantageously employed in the latter type apparatus, it is most readily applicable to the general type of feeding mechanism shown in U.S. Pat. No. 3,724,363. As can be seen in the 3,724,363 patent, a plurality of feeder finger pairs, 17–20, are rigidly fixed to a support bar 34 which rides on rollers within guide member 35. The fingers are moved through a somewhat elliptical pattern toward and away from bale forming chamber 11 to feed the crop materials into the chamber.

Because of the variation in type of crops being baled, their moisture content, size, etc., it has been found desirable to change the angle of certain of the fingers relative to the support bar 34. The actual change being considered is the depth of penetration of the finger into or toward the bale forming chamber — a change which, under certain conditions, better packs the material into the opposing corners and side of the bale chamber. Generally, the alterations are made to the first pair of fingers (closest to the bale forming chamber), but certain conditions call for the additional change of the second, or other, pairs. Also, though unusual, it may from time to time be found advantageous to have one pair of fingers at a different angle than the other. Except for the situations described below, the most well known method of modifying the angle is to have fingers manufactured with different angles, and substitute them for those being used.

U.S. Pat. No. 3,880,073 shows a feeder finger 46 which is angled toward the bale forming chamber 18. The finger may be rotated to reverse the angle and thus modify the feeding characteristics. Additionally, the finger may be moved along support bar 44 to modify its penetration into the bale forming chamber.

The adjustability shown in FIGS. 4 and 5 of U.S. Pat. No. 3,736,866 is likewise advantageous, but limited to only small variations.

The invention to be described below is to a feeder finger assembly which is easily adjusted over a relatively wide range to accommodate the varying crop conditions encountered.

SUMMARY OF THE INVENTION

It is an object of the instant invention to provide a feeder finger assembly for balers which may be easily varied over a wide range of angles to accommodate the changing crop conditions.

Another object of the instant invention is to provide a feeder finger assembly which may be selectively rigidly fixed in a multiplicity of angular positions relative to the infeed mechanism of a baler.

Another object of the instant invention is to provide a baler and a feeder finger assembly which together results in an apparatus suitable for use under a wide range of crop conditions.

It is a further object of the instant invention to provide a selectively angularly adjustable feeder finger assembly which is simple of construction, inexpensive of manufacture, and exceptionally effective in use.

These and other objects are obtained according to the instant invention by providing an improved feeder finger assembly comprised generally of three elements, i.e., a bracket for affixment to a driven element of the infeed mechanism, a feeder finger and means to hold the two together. Frictional mating surfaces on the bracket and the finger insure that the selective relative relationship between the two elements is maintained during operation.

BRIEF DESCRIPTION OF THE DRAWINGS

The advantages of this invention will become apparent upon consideration of the following detailed disclosure of the invention, especially when it is taken in conjunction with the accompanying drawings wherein.

DESCRIPTION OF THE PREFERRED EMBODIMENT

Figure 1:
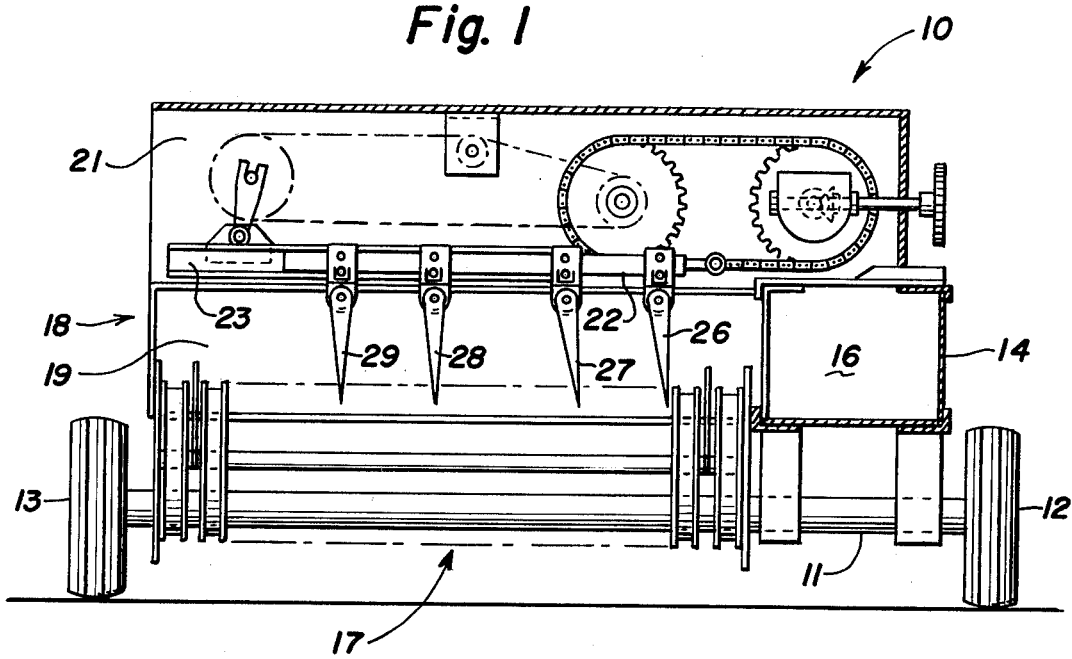
FIG. 1 is a front plan view, in partial cross section, of a baler showing the infeed mechanism and the other elemental structural relationships thereof.

FIG. 1 shows a front plan view of a baler, generally designated 10, in partial cross section. The baler 10 comprises a frame 11 supported for movement along the ground by a pair of wheels 12–13. An elongated bale case 14 extends in a fore-and-aft direction along one lateral side of frame 11 and includes a reciprocating plunger (not shown) on the fore end, a bale forming chamber 16, a tying mechanism and a discharge opening (also not shown) on the aft end. The crop materials lying on the ground in a swath or windrow, are picked up by a conventional rotary reel mechanism, shown generally at 17, and deposited in the infeed housing 18. The infeed housing includes a lower chamber 19 and an upper chamber 21. The infeed housing 18 is generally perpendicular to bale case 14, and both chambers 19 and 21 are in open communication with the bale forming chamber 16. As is generally known in the prior art, for example, see U.S. Pat. No. 3,724,363, the feeding mechanism shown in chamber 21 cycles a finger support bar 22 and guide support 23 along a path which moves depending feeder fingers 26–29 toward and away from bale forming chamber 16. The actual path of the feeder fingers is a complex loop, but the important fact is that at least the finger closest to the bale forming chamber 26 penetrates the confines of the chamber to push crop materials therein. A fair, though general, observation is that crop materials move in steps through the lower chamber 19 until they reach chamber 16 where they are compacted by the plunger.

Each of the feeder fingers 26–29 shown in FIG. 1 is, in most baler designs, actually a pair of side-by-side fingers spaced on opposite sides of the finger support bar 22 (better seen in FIG. 6 of the 3,724,363 patent mentioned above). One skilled in the art will realize that different crops and/or crop conditions present various feeding and bale forming problems. More specifically, conditions frequently arise where the crops cannot be fed by a straight feeder finger into the outside wall and corners of the bale forming chamber 16. This condition undesirably results in a non-uniform or loose bale. The solution to this problem in the past has been to remove the straight fingers and substitute curved fingers therefor, or move the finger closer to the bale forming chamber along the finger support bar. The instant invention is a third, more practical solution to this problem which requires few tools and a minimum of expertise in baler operation.

Figure 2:
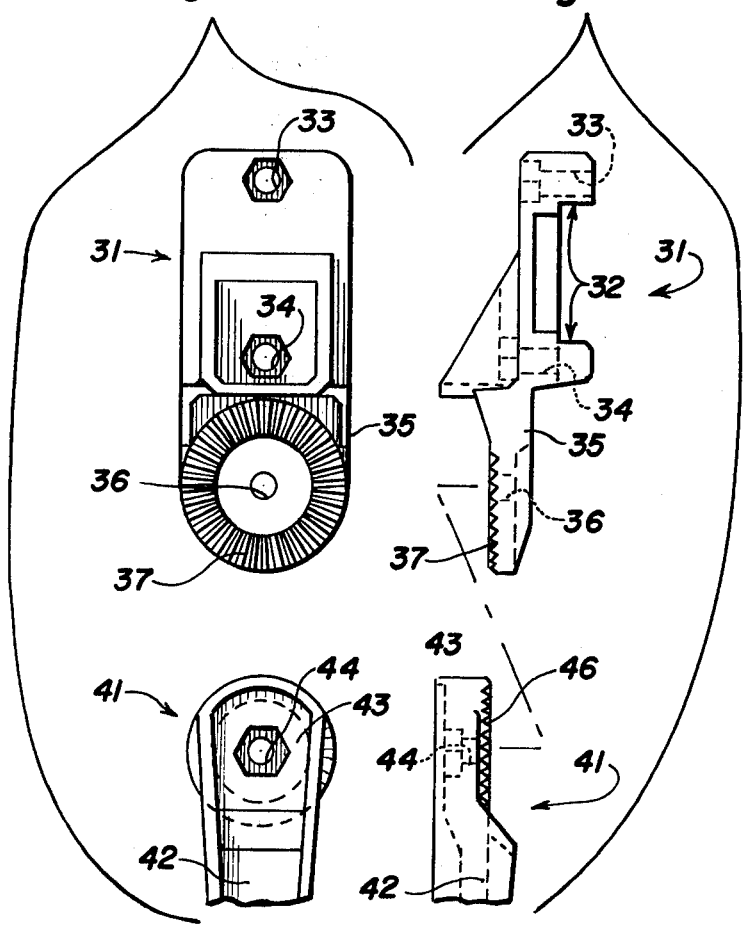
FIGS. 2–4 are front, side and rear plan views, respectively, of the bracket and feeder finger of the instant invention.
Figure 3:
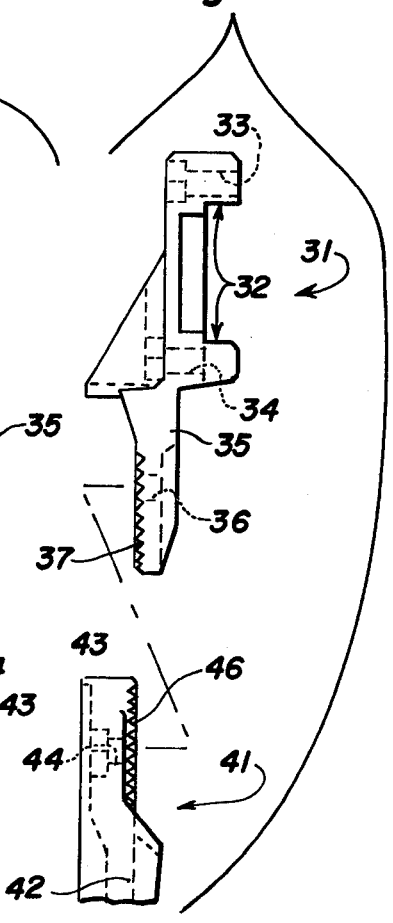
Figure 4:
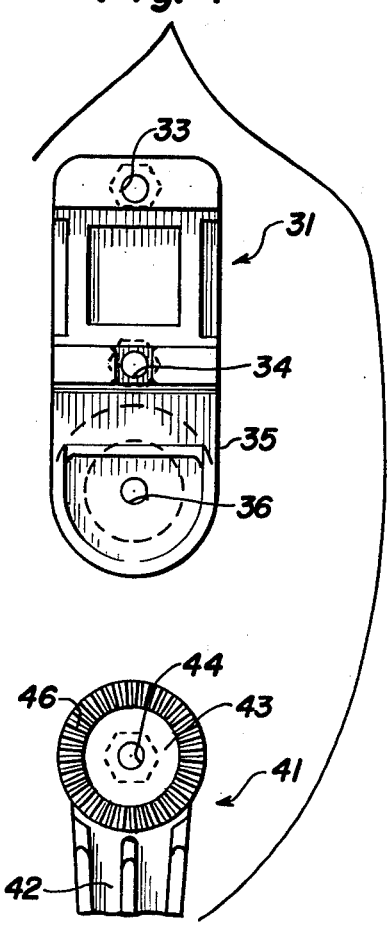

Referring now to FIGS. 2–4, the feeder finger assembly of the instant invention can be seen to comprise a bracket 31 and a feeder finger 41. A slot 32 is formed on the rear surface of bracket 31 and is sized to fit onto finger support bar 22 (see FIGS. 1 and 3). Holes 33 and 34 are provided on either side of slot 32 for the insertion of bolts and rigid affixment thereof to the finger support bar. For convenience, each hole may have a pre-formed countersunk portion shaped to accept the head of a bolt. A depending platelike portion 35 of bracket 31 can be seen in these figures to include an opening 36 therethrough and a multiplicity of serrations 37 extending radially away from opening 36 in a fixed pattern. The term "serration" is used herein to generally encompass any of a variety of surface irregularities which, when mated as shown herein, increase the normal frictional characteristics of a surface. The specific serrations shown in the drawings assume the form of elongated alternating high and low segments. It is contemplated that the serrations need not extend the full 360° around opening 36; however, the added holding capability of such an arrangement is desirable. Also, as will be understood, the serrations should be spaced at specific intervals to provide for ease of adjustment. It has been found particularly advantageous to space the serrations approximately about 10° apart.

Feeder finger 41 is shown to include an elongate substantially straight portion 42 (refer briefly to FIG. 5) and a head portion 43. Straight portion 42 is shown as having a sharply pointed lower end 43, but such could be made in any suitable configuration. The head portion 43 of finger 41 includes an opening 44 therethrough and a pattern of serrations 46 extending radially away therefrom. Serrations 46 and 37 are substantially similar, such that they mate when openings 44 and 36 are in alignment. Opening 44, like holes 33 and 44 may be advantageously provided with a countersunk area shaped to fit the head of a bolt.

Figure 5:
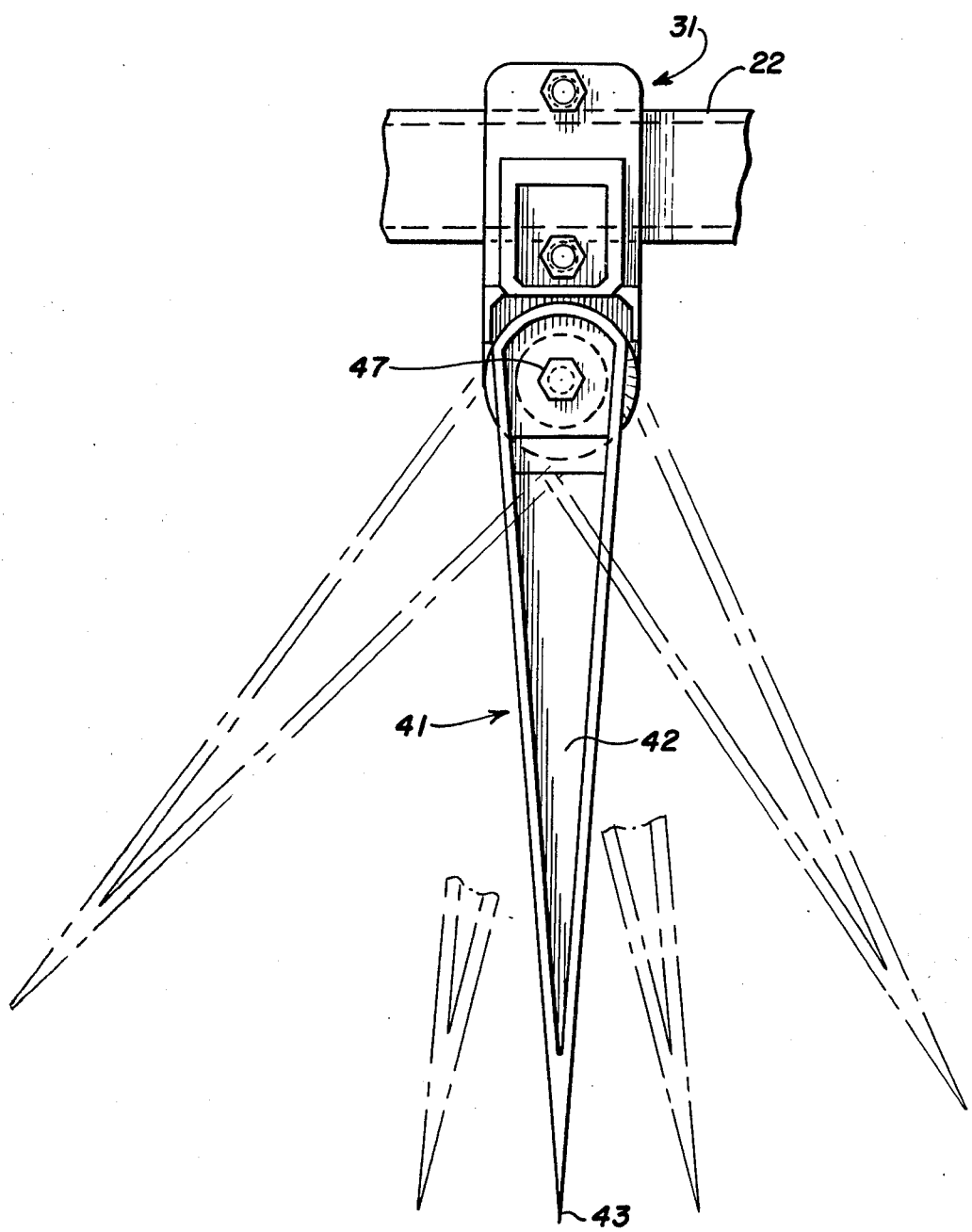
FIG. 5 is a front plan view of the feeder finger assembly of the instant invention showing exemplary angular positions that the finger may assume.

Referring now to FIG. 5, it can be seen that serrated surfaces 37 and 46 are brought into mating contact by a bolt 37 through openings 44 and 36. The mated serrations prevent the finger 41 from moving angularly relative to bracket 31, but at the same time permit selective angular repositioning. Preferably, with 10° spacing between serrations, the finger may be easily, and accurately moved through a series of positions on both sides of the vertical as seen in the figure. Though conditions could arise where more angular adjustment is desirable, it is contemplated that the most adjustment necessary would be approximately 30° on both sides of vertical.

It will be understood that various changes in the detail, and arrangement of parts, which have herein been described and illustrated in order to explain the nature of the invention, will occur and may be made by those skilled in the art upon a reading of the disclosure within the principles and scope of the invention.

Having thus described the invention, what is claimed is:

1. A feeder finger assembly for use in the feeding mechanism of a hay baler, said assembly comprising:
    (a) a bracket member having means thereon for affixment to a driven element of the feeding mechanism, said bracket member including a first substantially planar engagement surface having first friction means thereon;
    (b) an elongate substantially straight feeder finger having a first end and a second end, said finger including a second substantially planar engagement surface on said first end thereof having second friction means thereon; and
    (c) adjustable holding means forcing said first and second engagement surfaces together such that said first and second friction means prevent relative movement between said bracket member and said feeder finger.

2. The feeder finger assembly of claim 1, wherein:
    each said first and second engagement surfaces have openings therethrough, and said adjustable holding means comprises a threaded nut and bolt operably engaged with said bracket member and said feeder finger through said openings.

3. The feeder finger assembly of claim 2, wherein said first and second friction means are matable and substantially identical, and each comprises:
    a multiplicity of substantially equally spaced elongate serrations extending radially away from said opening.

4. The feeder finger assembly of claim 3, wherein said serrations are positioned to permit said feeder finger to be selectively moved at least through an angle of 60° relative to said bracket member.

5. The feeder finger assembly of claim 4, wherein said serrations are spaced substantially 10° apart and are positioned 360° around said opening.

6. In a hay baler having a bale-forming chamber, a reciprocating plunger cyclically moving into said chamber to compact crop materials therein, a pickup device for lifting crop materials from the surface of the ground to an infeed housing, and an infeed mechanism within said housing having a driven element and a multiplicity of feeder finger assemblies connected to and depending therefrom for movement toward and away from said bale-forming chamber, the improvement in said feeder finger assembly comprising:
- (a) a bracket member having means thereon for affixment to said driven element, said bracket member including a first engagement surface having first friction means thereon;
- (b) an elongate feeder finger having a first end and a second end, said finger including a second engagement surface on said first end thereof having second friction means thereon; and
- (c) adjustable holding means forcing said first and second engagement surfaces together such that said first and second friction means prevent relative movement between said bracket member and said feeder finger.

7. The baler of claim 6, wherein:
said first and second engagement surfaces lie in a plane substantially parallel to the plane of the motion of said driven element.

8. The baler of claim 7, wherein:
said feeder finger is substantially straight.

9. The baler of claim 8, wherein:
each said first and second engagement surfaces have openings therethrough and said adjustable holding means comprises a threaded nut and bolt operably engaged with said bracket member and said feeder finger through said openings.

10. The baler of claim 9, wherein:
said first and second friction means are matable and substantially identical, and each comprises
a multiplicity of substantially equally spaced alongate serrations extending radially away from said opening.

11. The baler of claim 10, wherein:
said serrations are positioned to permit said feeder finger to be selectively moved at least through an angle of 60°, 30° on each side of a vertical plane through said bracket member and said feeder finger.

12. The baler of claim 11, wherein:
said serrations are spaced substantially 10° apart and are positioned 360° around said opening.

13. In a hay baler having a bale-forming chamber, a reciprocating plunger cyclically moving into said chamber to compact crop materials therein, a pickup device for lifting crop materials from the surface of the ground to an infeed housing, and an infeed mechanism within said housing including a substantially straight elongate support member and a guide member in reciprocal supporting relation thereto, the improvement in said infeed mechanism including a plurality of feeder finger assemblies fixed to said elongate support member, each feeder finger assembly comprising:
- (a) a bracket member having means thereon for rigid, non-pivoting affixment to said elongate support member, said bracket member including a first substantially planar engagement surface having first friction means thereon;
- (b) an elongate feeder finger having a first end and a second end, said finger including a second substantially planar engagement surface on said first end thereof having second friction means thereon; and
- (c) adjustable holding means forcing said first and second engagement surfaces together such that said first and second friction means prevent relative movement between said bracket member and said feeder finger.

14. The baler of claim 13, wherein:
said first and second engagement surfaces lie in a plane substantially parallel to the plane of motion of said elongate support member.

15. The baler of claim 14, wherein:
each said first and second engagement surfaces have openings therethrough, and said adjustable holding means comprises a threaded nut and bolt operably engaged with said bracket member and said feeder finger through said openings.

16. The baler of claim 15, wherein:
said first and second friction means are matable and substantially identical, and each comprises:
a multiplicity of substantially equally spaced elongate serrations extending radially away from said opening.

17. The baler of claim 16, wherein:
said serrations are positioned to permit said feeder finger to be selectively moved at least through an angle of 60°, 30° on each side of a vertical plane through said bracket member and said feeder finger.

18. The baler of claim 17, wherein:
said serrations are spaced substantially 10° apart and are positioned 360° around said opening.

* * * * *